United States Patent Office 2,989,827
Patented June 27, 1961

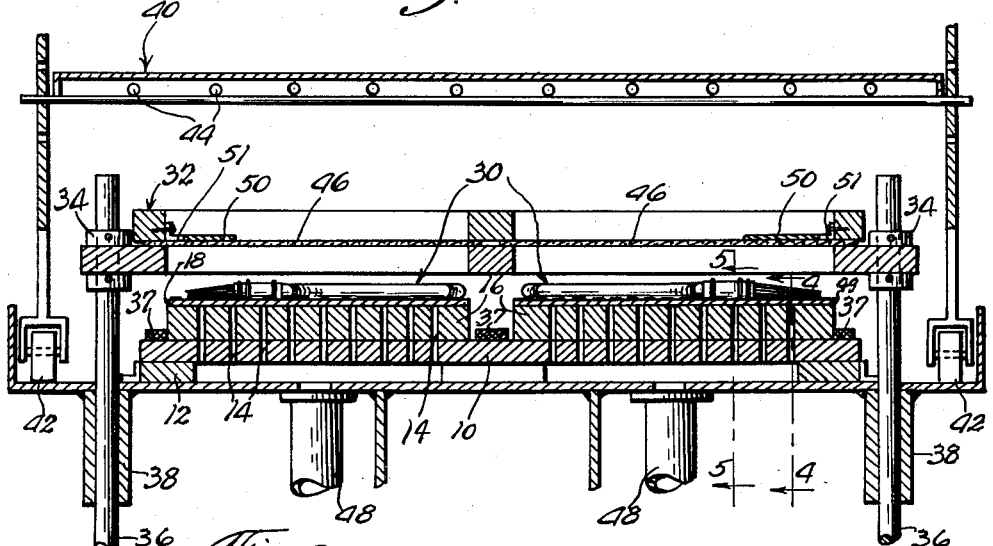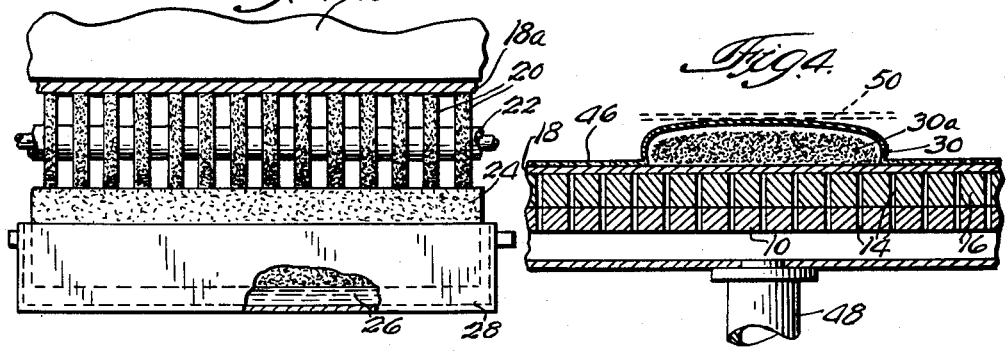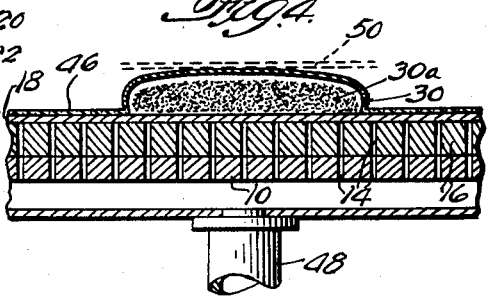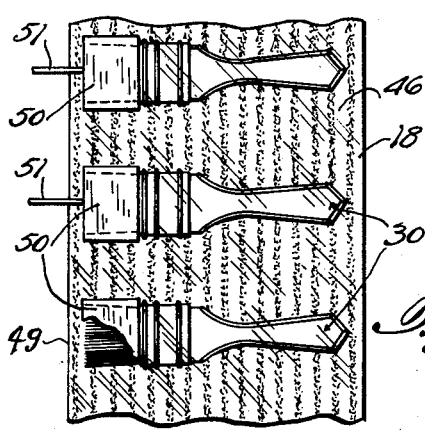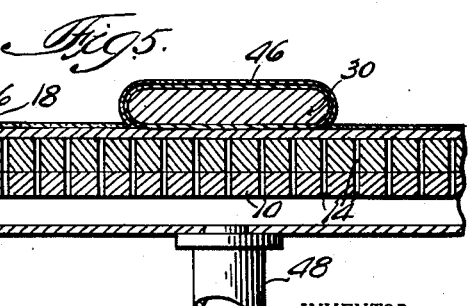

2,989,827
PACKAGING PROCESS
Fred A. Groth, Chicago, Ill., assignor, by mesne assignments, to Union Carbide Corporation, New York, N.Y., a corporation of New York
Filed Aug. 15, 1956, Ser. No. 604,110
4 Claims. (Cl. 53—22)

The present invention relates to an improved packaging process, and, more particularly, pertains to a method of packaging readily deformable objects, and is a continuation-in-part of my copending application Serial No. 505,357, filed May 2, 1955, now Patent No. 2,855,735.

The method disclosed in the latter copending application is rapidly becoming of increasingly greater commercial significance. This process comprises coating cardboard or other material through which air may permeate when suction is applied to a surface thereof, with an adhesive in a noncontinuous manner. An article to be packaged is placed on the coated surface and a thermoplastic sheet is disposed over the article and air-permeable material. A heat-radiating source is then moved over the thermoplastic sheet and the underlying package components; the heat readily plasticizes the thermoplastic sheet. Suction is then applied to the uncoated surface of the cardboard sheet, whereby the atmosphere trapped between the partially coated cardboard sheet and the opposed plastic sheet is withdrawn through the uncoated areas of the cardboard surface and the underlying board interstices. The thermoplastic sheet is thus drawn into tight engagement with the article and adhesive-coated cardboard surface, and subsequently cooled and hardened.

As also explained in the copending application, adhesive coating on a cardboard surface functions to clog the interstices thereof making the passage of air therethrough impossible when a vacuum is applied. However, by applying the adhesive in a noncontinuous manner, or by coating the entire surface and subsequently removing portions of the adhesive coating, passage of air through the uncoated cardboard areas and the interstices therebeneath is enabled to be effected.

Some articles to be packaged are deleteriously affected by the thermoplastic covering when the latter covering is in the heated or plastic condition. For instance, low-melting point materials such as certain plastics may fuse with the heated thermoplastic sheet or be otherwise distorted or warped by the application of the heat radiating from the oven heating elements or the heat contained in the sheet. Other articles such as some articles of clothing in addition to being affected by the heat will be compressed by the atmospheric pressure acting against the overlying heated thermoplastic sheet and the plastic in the heated condition will readily flow into the weave interstices of the particular fabrics being packaged. Upon cooling, the thermoplastic sheet covering will present a most unattractive appearance having little, if any, sales appeal.

It is an object, therefore, of this invention to provide a method of packaging articles readily deformable by either pressure or heat, which produces final packages of attractive appearance and good sales appeal.

It is another object of this invention to provide a method of packaging readily compressible articles which does not permanently deform or otherwise deleteriously affect the compressible article being packaged.

It is a still further object of this invention to provide a method of packaging deformable articles which requires no elaborate or expensive equipment or materials in addition to the ordinary packaging apparatus.

It is yet another object of this invention to provide a method of packaging articles which is simple to carry out and in no way alters the time or other conditions of the regular packaging process.

It is another object of this invention to provide a method of forming a novel package construction which may be tailor made to conform with the needs of the contents contained therein with a minimum of effort and expense.

The above and other objects of this invention will appear from the following detailed description, the appended claims and the accompanying drawing.

In carrying out one embodiment of this invention, an air-permeable substantially rigid base member, such as a sheet of cardboard, is coated with an adhesive in a discontinuous manner whereby uncoated surface areas remain thereon. By air-permeable it is meant that air will pass through the interstices of the cardboard when suction is applied to the undersurface thereof. An article to be packaged is then placed on the adhesive-coated surface. Next, a sheet of thermoplastic material is disposed over the article to be packaged and the air-permeable base. A heat shield is disposed over that portion of the article to be packaged which is readily deformable by heat or pressure; if the article is completely, readily deformable, the heat shield will be disposed over the entire article. The latter heat shield is also disposed above the thermoplastic sheet material and may be secured to a frame in which the sheet material is secured.

A heat source for plasticizing the thermoplastic sheet material is then disposed over the article to be packaged, the thermoplastic sheet material and the heat shield. It is apparent, therefore, that only that portion of the thermoplastic sheet is plasticized which is not covered by the heat shield. After sufficient heat has been imparted to the thermoplastic sheet to plasticize the same, the sheet is lowered and draped over the article to be packaged and the base member on which it is disposed. Simultaneously, suction is applied to the undersurface of the base, and the thermoplastic sheet is drawn tightly to the surfaces of the article and the supporting base. That portion of the thermoplastic sheet material which was not plasticized will be disposed over the readily deformable portion of the article. Consequently, when suction is applied, it will not conform to the configuration of the article in its pressure deformed state but will remain hardened. The nonplasticized portion is also prevented from drawing thin and thereby causing a rupture in the plastic film. The plasticized portion of the covering sheet material, however, will be tightly drawn and assume a closely adhering relationship to the nondeformable portion of the article to be packaged and the supporting base member therefor.

For a more complete understanding of this invention, reference should now be given to the drawing, wherein:

FIGURE 1 is a fragmentary transverse sectional view, partly in elevation, of an apparatus which may be employed in carrying out the process provided by this invention;

FIG. 2 is a fragmentary elevational view, partly in section, illustrating one means which may be employed for applying adhesive to sheets of air-permeable material;

FIG. 3 is a fragmentary top plan view illustrating the heat shields of this invention disposed above articles to be packaged;

FIG. 4 is a sectional view taken on line 4—4 of FIG. 1, and

FIG. 5 is a sectional view taken on line 5—5 of FIG. 1.

Referring to FIG. 1, appropriate apparatus which may be employed for purposes of this invention is illustrated. The apparatus comprises an apertured platform 10 supported by a suitable framework 12. The platform 10 has a plurality of apertures 14 running therethrough for purposes which will hereinafter be made apparent. Surmounted on the platform 10 are two mounting base members 16. The latter members also have air passages 14 running therethrough which are in alignment with air passages 14 disposed in the underlying platform member.

The mounting base members 16 are of appropriate size so as to receive thereon an air-permeable semirigid base member, such as a cardboard sheet 18 which will comprise part of the finished package. The cardboard 18 has been coated in a non-continuous manner with an adhesive and also has disposed on the adhesive coated surface thereof an article to be packaged. As previously mentioned, the invention herein disclosed is concerned with the packaging of articles which are, at least in part, readily deformable by either heat or pressure. The readily deformable portion of the article being packaged in the drawing comprises bristles of a paint brush 30.

The discontinuous adhesive coating may be applied to a cardboard member such as the cardboard strip 18 illustrated in FIG. 3 by means of a series of rotating disc members 20 illustrated in FIG. 2 which are positioned on a rotating shaft 22. Peripheral portions of the rotating discs 20 engage an idler roll 24 which is partly immersed in adhesive 26 contained in a pan 28. Diametrically opposed to the peripheral portions of the disc members 20 which contact the idler roll 24 are a second series of peripheral disc portions which contact a cardboard sheet 18a which is passing over the rotating disc members 20. A suitable holddown member 19 maintains the cardboard against the rotating discs. The adhesive 26 in the pan member 28 is preferably heat sensitive and will harden at room temperatures, thereby facilitating storage and handling of coated board prior to the actual packaging operation. However, it should be at this time noted that other types of adhesive such as the pressure sensitive type will function to equal advantage for purposes of the invention.

The application of the adhesive, as disclosed in my copending application, may be carried out in any number of ways. The governing principle is that uncoated areas of the air-permeable base member remain following the coating operation so as to enable air to be drawn through the interstices thereof.

Following the coating of the air-permeable base member or cardboard strip 18, a strip or sheet of appropriate size, having a plurality of brushes 30 mounted thereon at predetermined intervals is disposed on the mounting bases 16 illustrated in FIG. 1. Mounted above the mounting bases 16 is a clamping frame 32 which is adapted to secure thermoplastic sheets 46 over the articles to be packaged. The frame, in addition, lowers the later sheet materials into engagement with the articles to be packaged; that is, the brushes 30, and the cardboard base members 18 on which the latter brushes are disposed. The clamping frame is secured at lateral end portions, by means of collar members 34, to reciprocally movable rod members 36 which in the course of their movement are guided by sleeves 38 also illustrated in FIG. 1. Any suitable clamping device for lowering the thermoplastic sheet material onto the articles to be packaged will be suitable; it is intended that the depicted apparatus be shown by way of illustration and not limitation.

Preliminarily to lowering the thermoplastic sheet material, it must be plasticized by the application of heat. The means for applying the heat comprises the movable oven 40 which is mounted on wheel members 42 for purposes of readily being moved into position over the clamping frame 32 when desired. Disposed along the ceiling portion of the movable oven 40 are a plurality of heating rods 44 which radiate sufficient heat so as to readily plasticize the thermoplastic sheets 46 mounted in the clamping frame member 32.

If the entire surface of the thermoplastic sheet materials 46 were exposed to the heat radiating from the heating rods 44 of the oven 40, the entire area of the thermoplastic sheets would become softened. When lowered into engagement with the brushes 30 by means of the reciprocally movable rods 36, a seal would be effected between lower portions of the frame 32 and a gasket 37 disposed on the platform 10. When suction is applied to the under surface of the cardboard 18 through means such as conduits 48 illustrated in FIG. 1, the entire thermoplastic sheet material would be tightly drawn into closely adhering engagement with the surfaces of the supporting base member 18 and the brushes 30 disposed thereon. The plastic sheet material would be drawn against the bristles in their pressure deformed condition and following cooling and hardening of the sheets 46 would present an unattractive appearance, as the plastic sheet would harden in the same contour as that of the distorted bristles.

However, if a heat-shielding means such as the shields 50 illustrated in FIGS. 1 and 3 were disposed between the heat-radiating rods 44 of the movable oven and that portion of the thermoplastic sheet 46 which is intended to engage the bristles of the brush, that portion of the thermoplastic sheet which is covered by the shields 50 will not become plastic and deformable in nature and will remain in a substantially firm condition. Also, the article portion covered will not be subjected to the radiating heat and will remain unaffected thereby. When the clamping frame 32 is lowered by means of the rods 36, the shielded portions of the thermoplastic sheets 46 will be nonplastic and function as a rigid protective surface which will not be drawn in between the bristles of the brushes 30, thereby providing a package appearance which is pleasing to the eye and possessed of great sales appeal. The unheated portions of the plastic sheets 46 will provide an even surface with no depressions into the brush bristles following the packaging process.

It will be noted from FIGS. 1 and 3 that the shields 50 project a slight distance inwardly away from the edge 49 of the strip 18 to insure that a seal will be formed by a softened plastic portion of the sheet 46 about the entire periphery of the sheet 18. Supporting means such as wires 51 illustrated in FIGS. 1 and 3 should also preferably be thin so as to insure the formation of an efficient air-tight seal about the card periphery between the card and overlying plastic sheet.

Referring to FIGS. 4 and 5, the differences in the adherence between the heated porton of the thermoplastic sheets 46 and the unheated portions of the thermoplastic sheets to the respective brush portions which they are disposed over may be readily seen. In FIG. 4 it will be noted that the bristles 30a of the brush member 30 are covered by a portion of the thermoplastic sheet 46 which is disposed in the manner of a blister and actually separated from the bristles 30a; there is no permanent deformation of the thermoplastic sheet material occasioned by contact with the brush bristles 30a.

However, referring to FIG. 5, the manner in which the heated thermoplastic sheet material 46 engages a nondeformable portion of a brush member 30 is illustrated. It will be noted that the overlying plastic sheet 46 engages the underlying brush in a snug manner.

It is apparent, therefore, that, by shielding appropriate surface area portions of the thermoplastic sheet materials which are to engage the deformable portions of the articles to be packaged or the entire article, if the same be completely deformable, a protective cover may be formed over these article portions. The remainder of the thermoplastic sheet will still, however, engage the nondeformable portion of the article and the adhesive-coated supporting base member in a desired manner which provides a pleasing appearance.

For purposes of this invention, a shield may comprise any material which is sufficient to retard the passage of heat to the thermoplastic sheet, and the article portion disposed thereunder. The shielded sheet portion thus is allowed to remain in a substantially rigid and unsoftened condition. The shield may be formed of thin gauge metal or other heat resistant material suitable for the purpose desired. In the illustrated apparatus of FIG. 1, the shield is depicted as being secured to a portion of the clamping frame. This is one advantageous manner of positioning the heat shields, but it is merely given by way of illustration. The shields may be secured to any supporting member, such as the reciprocally movable rods 36 and will still function in precisely the same manner. It is conceivable that prepositioned air jets may function to cool selected areas of the thermoplastic sheets, and this concept is intended to be construed as within the ambit of the inventive concept disclosed.

In addition to providing a more attractive final package, the process of packaging disclosed herein obviously protects the article itself from warping, melting or from otherwise being deleteriously affected by the heat.

For instance, low-melting point plastic objects and cloth items of wearing apparel will be adversely affected by the high temperatures involved in the plasticizing of the thermoplastic sheet materials. With items of wearing apparel, the heat shields will not only prevent the plastic sheet material from being drawn into the weave interstices resulting in an unattractive package but, in addition, will also prevent destructive thermal influences from being exerted on the cloth items.

Also, the method of shielding above disclosed also prevents thermoplastic sheet materials from drawing thin and rupturing when articles of large bulk are packaged. Since the article-covering portion of the thermoplastic sheet is firm and nonplastic when suction is applied in the course of the process, portions covering the article to be packaged depending along the sides of the article and engaging the underlying base will not stretch and thin out. Consequently, although an article to be packaged rises substantially above the plane of the supporting base, the thermoplastic cover will not break.

It is believed that it has been made apparent from the above discussion of the inventive process disclosed that many modifications may be made in apparatus and procedural steps which will still remain within the ambit of inventive concept disclosed. Although the illustrated paint brushes are given by way of example as one type of readily deformable article, it is apparent that other deformable articles such as items of clothing, low-melting point plastics, etc., are intended to be packaged in accordance with the inventive concepts herein disclosed. It is intended, therefore, that this invention be limited only by the scope of the appended claims.

I claim:

1. A process for the packaging of an article which is at least in part readily deformable, the steps comprising placing such article on a surface of a porous supporting object, disposing a thermoplastic sheet over said supporting object, positioning a heat-resistant shield capable of inhibiting transmission of radiant heat over that portion of said thermoplastic sheet disposed above the readily deformable portion of said article to be packaged, heating the remaining portion of said thermoplastic sheet until softened, draping said thermoplastic sheet over said article to be packaged and said supporting object and withdrawing the atmosphere from between said thermoplastic sheet and said porous supporting object by means of reduced pressure conditions applied to the exterior surface of said porous supporting object.

2. A process for the packaging of an article which is at least in part readily deformable, the step comprising placing such article on a surface of a porous supporting object, disposing a thermoplastic sheet over said supporting object, positioning a heat-resistant shield over that portion of said thermoplastic sheet disposed above the readily deformable portion of said article to be packaged, heating the remaining portion of said thermoplastic sheet until softened, draping said thermoplastic sheet over said article to be packaged and said supporting object and withdrawing the atmosphere from between said thermoplastic sheet and said porous supporting object by means of reduced pressure conditions applied to the exterior surface of said porous supporting object, only that portion of said thermoplastic sheet previously disposed beneath said heat-resistant shield being urged toward the readily deformable portion of the article being packaged as a result of said atmosphere withdrawing step.

3. A process for the packaging of an article which is at least in part readily deformable, the steps comprising placing such article on a surface of a porous supporting object, having areas coated with a pressure sensitive adhesive and non-coated areas thereon, disposing a thermoplastic sheet over said supporting object, positioning a heat-resistant shield capable of inhibiting transmission of radiant heat over that portion of said thermoplastic sheet disposed above the readily deformable portion of said article to be packaged, heating the remaining portion of said thermoplastic sheet until softened, draping said thermoplastic sheet over said article to be packaged and said supporting object and withdrawing the atmosphere from between said thermoplastic sheet and said porous supporting object by means of reduced pressure conditions applied to the exterior surface of said porous supporting object.

4. A process for the packaging of an article which is at least in part readily deformable, the steps comprising placing such article on a surface of a porous supporting object having areas coated with a heat-sensitive adhesive and non-coated areas thereon, disposing a thermoplastic sheet over said supporting object, positioning a heat-resistant shield over that portion of said thermoplastic sheet disposed above the readily deformable portion of said article to be packaged, heating the remaining portion of said thermoplastic sheet until softened, draping said thermoplastic sheet over said article to be packaged and said supporting object, and withdrawing the atmosphere from between said thermoplastic sheet and said porous supporting object by means of reduced pressure conditions applied to the exterior surface of said porous supporting object, only that portion of said thermoplastic sheet previously disposed beneath said heat-resistant shield being urged toward the readily deformable portion of the article being packaged as a result of said atmosphere-withdrawing step.

References Cited in the file of this patent

UNITED STATES PATENTS

| Number | Name | Date |
|---|---|---|
| 1,831,036 | Scholl | Nov. 10, 1931 |
| 2,210,509 | Strauch | Aug. 6, 1940 |
| 2,313,696 | Yates | Mar. 9, 1943 |
| 2,497,212 | Donofrio | Feb. 14, 1950 |
| 2,568,625 | Harvey | Sept. 18, 1951 |
| 2,615,200 | Cloud | Oct. 28, 1952 |
| 2,750,719 | Wandelt | June 19, 1956 |
| 2,836,941 | Hultkrans | June 3, 1958 |
| 2,855,735 | Groth | Oct. 14, 1958 |
| 2,861,404 | Stratton | Nov. 25, 1958 |

FOREIGN PATENTS

| Number | Country | Date |
|---|---|---|
| 201,271 | Australia | Apr. 7, 1955 |